United States Patent
Ari

(10) Patent No.: US 7,495,198 B2
(45) Date of Patent: Feb. 24, 2009

(54) SYSTEM AND METHOD FOR IMPROVING NIGHTTIME VISUAL AWARENESS OF A PILOT FLYING AN AIRCRAFT CARRYING AT LEAST ONE AIR-TO-AIR MISSILE

(75) Inventor: Tsafrir Ben Ari, Shimshit (IL)

(73) Assignee: Rafael Advanced Defense Systems Ltd., Haifa (IL)

( * ) Notice: Subject to any disclaimer, the term of this patent is extended or adjusted under 35 U.S.C. 154(b) by 334 days.

(21) Appl. No.: 11/290,587

(22) Filed: Dec. 1, 2005

(65) Prior Publication Data
US 2006/0181483 A1   Aug. 17, 2006

(30) Foreign Application Priority Data
Dec. 1, 2004   (IL) ..................................... 165497

(51) Int. Cl.
*F41G 11/00* (2006.01)
*F41G 9/00* (2006.01)
*F41G 7/00* (2006.01)
*G02B 27/01* (2006.01)

(52) U.S. Cl. ...................... 244/3.1; 244/3.11; 244/3.15; 244/3.16; 244/3.19; 340/945; 340/971; 345/7; 345/8; 359/618; 359/629; 359/630

(58) Field of Classification Search ........... 244/3.1–3.3; 356/9, 12, 13, 247–256; 359/629, 630, 618; 348/42, 51–60, 739; 345/7–9; 340/901, 340/945, 971; 89/41.01–41.22; 33/227, 33/262; 342/52–58, 60–67, 175–184, 195
See application file for complete search history.

(56) References Cited

U.S. PATENT DOCUMENTS 3,633,988 A * 1/1972 Farrar .......................... 33/262
3,833,300 A * 9/1974 Rymes ........................ 356/13
5,931,874 A   8/1999 Ebert (Continued)

FOREIGN PATENT DOCUMENTS

WO   WO02/13168   2/2002

OTHER PUBLICATIONS

A. Parsch, "AGM/RGM/UGM-84"; "Directory of U.S. Military Rockets and Missiles" on the Internet at designation-systems.net; no date given; copyrighted in the years 2002-2003; last modified on Nov. 4, 2003; accessed on Jan. 28, 2008.*

*Primary Examiner*—Bernarr E Gregory
(74) *Attorney, Agent, or Firm*—Mark M. Friedman

(57) ABSTRACT

A method for improving nighttime visual awareness of a pilot flying an aircraft carrying an air-to-air missile including one or more one gimbaled imaging sensor. The method includes providing a helmet for the pilot, a helmet tracking system for determining the attitude of the helmet relative to the aircraft, and a helmet-mounted display. The method also includes determining a current imaging sensor viewing direction of the imaging sensor of the air-to-air missile, sampling an image from the imaging sensor of the air-to-air missile and displaying the image on the helmet-mounted display. The determining and the displaying are performed so that the image displayed on the helmet-mounted display viewed by the pilot is spatially aligned with the scene viewed by the imaging sensor.

41 Claims, 9 Drawing Sheets

U.S. PATENT DOCUMENTS 6,349,898 B1 * 2/2002 Leonard et al. ............ 244/3.15
6,667,694 B2 * 12/2003 Ben-Ari et al. ................ 345/8
6,789,763 B2 9/2004 Ben Ari
6,961,007 B2 * 11/2005 Ben-Ari et al. ............. 340/945

* cited by examiner

SYSTEM AND METHOD FOR IMPROVING NIGHTTIME VISUAL AWARENESS OF A PILOT FLYING AN AIRCRAFT CARRYING AT LEAST ONE AIR-TO-AIR MISSILE

FIELD AND BACKGROUND OF THE INVENTION

The present invention relates to nighttime operation of weapon systems and, in particular, it concerns a system and method for improving nighttime visual awareness of a pilot flying an aircraft carrying at least one air-to-air missile Although certain modern aircraft are equipped with sophisticated night-vision equipment, many aircraft are not. Much of the aircraft instrumentation and weapon systems function well in dark conditions, but the lack of intuitive visual stimulus to the pilot or other crew members hampers their effective operation in various respects.

One particular problem relating to nighttime air-to-air combat is verification of targets. Radar systems and other target acquisition systems do not depend upon light, and can therefore acquire targets in zero lighting conditions, thereby allowing an air-to-air missile to be locked-on so as to track a target. Prior to firing, however, it is essential that the pilot verify the identity of the target to avoid firing at false targets or friendly forces. This verification is very problematic under poor lighting conditions, frequently leaving the pilot staring out into the darkness in the vain hope of catching a sufficiently clear momentary glimpse of the target to verify the target identity.

In the field of remote controlled bombs, it is known to provide a display onboard an aircraft which displays a video image from an imaging sensor mounted on the bomb relayed back to the aircraft by wireless communication. An operator on the aircraft can then steer the bomb remotely towards the target. An example of such a system is described in U.S. Pat. No. 5,931,874. Such display systems, however, are only available for remote controlled devices and have not been used to display images of automatically acquired targets prior to launch. Furthermore, the head-down video display of remote controlled bombs is divorced from the geometrical frame of reference of the aircraft, thereby rendering the images counterintuitive for a pilot to interpret, and possibly even disorienting.

In order to render tracking reliability more robust against various countermeasures, most modem air-to-air missiles apply image-processing-based tracking algorithms on images derived from a high-sensitivity gimbaled imaging sensor sensitive to infrared radiation. The imaging sensor generally has a very narrow field of view, typically spanning no more than about 6° at most. Conventional systems do not employ the imaging sensor output for visual display to a pilot.

There is therefore a need for a system and method for facilitating verification of automatically-acquired targets or provide other night-vision functionality during nighttime air-to-air combat. It would also be valuable to provide a system and method which would improve situational awareness for a pilot viewing images derived from a missile-based imaging sensor.

SUMMARY OF THE INVENTION

The present invention is a system and method for providing night-vision functionality to a pilot by using missile-based imaging sensors According to the teachings of the present invention there is provided, a method for improving nighttime visual awareness of a pilot flying an aircraft carrying an air-to-air missile including at least one gimbaled imaging sensor, the method comprising: (a) providing: (i) a helmet for the pilot, (ii) a helmet tracking system for determining the attitude of the helmet relative to the aircraft, and (iii) a helmet-mounted display; (b) determining a current imaging sensor viewing direction of the imaging sensor of the air-to-air missile; (c) sampling an image from the imaging sensor of the air-to-air missile; and (d) displaying the image on the helmet-mounted display, wherein the determining and the displaying are performed such that the image displayed on the helmet-mounted display as viewed by the pilot is substantially spatially aligned with the corresponding scene viewed by the imaging sensor.

According to a further feature of the present invention, at least in a first mode of operation, the image is displayed at a dynamically-moving position on the helmet-mounted display such that a viewing direction of the image for the pilot is aligned with the imaging sensor viewing direction substantially independent of the attitude of the helmet.

According to a further feature of the present invention, the first mode image is selectively actuated while the air-to-air missile is tracking a target.

According to a further feature of the present invention, when the viewing direction of the imaging sensor lies outside the area of the helmet-mounted display, an indication visible to the pilot is generated on the helmet-mounted display indicative of an angular direction of helmet movement required to bring the viewing direction of the imaging sensor within the area of the helmet-mounted display.

According to a further feature of the present invention, responsive to an actuation signal from the pilot, an enlarged display of at least part of the image is temporarily generated on the helmet-mounted display to facilitate target verification.

According to a further feature of the present invention, at least in a second mode of operation, the determining is achieved by driving a gimbal mechanism of the air-to-air missile such that the viewing direction of the imaging sensor is adjusted as a function of the attitude of the helmet.

According to a further feature of the present invention, the method selectively operates: (a) in a first mode of operation wherein the image is displayed at a dynamically-moving position on the helmet-mounted display such that a viewing direction of the image for the pilot is aligned with the imaging sensor viewing direction substantially independent of the attitude of the helmet; and (b) in a second mode of operation wherein the determining is achieved by driving a gimbal mechanism of the air-to-air missile such that the viewing direction of the imaging sensor is adjusted as a function of the attitude of the helmet.

According to a further feature of the present invention, the method switches in response to a lock-on signal from the air-to-air missile from the second mode to the first mode.

According to a further feature of the present invention, the image is transmitted wirelessly from a missile launcher associated with the air-to-air missile to a processing system associated with the helmet-mounted display.

There is also provided, according to the teachings of the present invention, a system for improving nighttime visual awareness of a pilot flying an aircraft, the system comprising: (a) at least one air-to-air missile mounted on the aircraft, the air-to-air missile including at least one gimbaled imaging sensor; (b) a helmet worn by the pilot; (c) a helmet tracking system deployed for determining the attitude of the helmet relative to the aircraft; (d) a helmet-mounted display associated with the helmet; (e) a processing system for controlling the helmet-mounted display; (f) a communication link associated with the air-to-air missile and the processing system for transmitting to the processing system an image sensed by the imaging sensor, wherein the processing system is configured to control the helmet-mounted display to display at least part of the image such that the display as viewed by the pilot is substantially spatially aligned with the corresponding scene viewed by the imaging sensor.

According to a further feature of the present invention, the processing system is selectively operative to display the image from the imaging sensor at a dynamically-moving position on the helmet-mounted display such that a viewing direction of the image for the pilot is aligned with the imaging sensor viewing direction.

According to a further feature of the present invention, the processing system is operative to selectively display the image while the air-to-air missile is tracking a target.

According to a further feature of the present invention, the communication link is implemented as a wireless communication link from a missile launcher associated with the air-to-air missile to the processing system.

According to a further feature of the present invention, the processing system is further operative: (a) to determine whether the viewing direction of the imaging sensor lies outside the area of the helmet-mounted display; and (b) when the viewing direction of the imaging sensor lies outside the area of the helmet-mounted display, to generate on the helmet-mounted display an indication visible to the pilot indicative of an angular direction of helmet movement required to bring the viewing direction of the imaging sensor within the area of the helmet-mounted display.

There is also provided, according to the teachings of the present invention, a method for nighttime control of an air-to-air missile with a gimbaled imaging sensor, the method comprising: (a) performing non-visual target acquisition so that the air-to-air missile tracks a target; and (b) displaying to an operator an image sensed by the imaging sensor of the air-to-air missile for visual target verification.

According to a further feature of the present invention, the non-visual target acquisition is performed by transfer of a target direction from a radar system to the air-to-air missile.

According to a further feature of the present invention, the non-visual target acquisition is performed autonomously by a scanning process performed by the missile.

According to a further feature of the present invention, the non-visual target acquisition is performed by use of target location data provided via a wireless communication link from outside the aircraft.

According to a further feature of the present invention, the image is displayed on an opaque screen.

According to a further feature of the present invention, the image is displayed on a head-up display.

According to a further feature of the present invention, the image is displayed at a dynamically-moving position on the head-up display such that a viewing direction of the image for the pilot is aligned with the imaging sensor viewing direction.

According to a further feature of the present invention, the image is displayed on a helmet-mounted display.

According to a further feature of the present invention, the image is transmitted wirelessly from a missile launcher associated with the air-to-air missile to a processing system associated with the helmet-mounted display.

According to a further feature of the present invention, the image is displayed at a dynamically-moving position on the helmet-mounted display such that a viewing direction of the image for the pilot is aligned with the imaging sensor viewing direction.

According to a further feature of the present invention, when the viewing direction of the imaging sensor lies outside the area of the helmet-mounted display, an indication visible to the pilot is generated on the helmet-mounted display indicative of an angular direction of helmet movement required to bring the viewing direction of the imaging sensor within the area of the helmet-mounted display.

There is also provided, according to the teachings of the present invention, a system for nighttime control of an air-to-air missile with a gimbaled imaging sensor, the system comprising: (a) an air-to-air missile with a target seeker including a gimbaled imaging sensor; (b) a non-visual target acquisition system operatively associated with the missile to cause the target seeker to track the target; (c) a display deployed so as to be visible to an operator; and (d) a communication link deployed for transmitting an image derived from the imaging sensor to the display for display to the operator.

According to a further feature of the present invention, the target acquisition system includes a radar system.

According to a further feature of the present invention, the target acquisition system includes a target acquisition module associated with the missile for actuating the seeker to perform an autonomous search pattern for a target.

According to a further feature of the present invention, the target acquisition system includes a wireless data link providing target data from a source outside the aircraft.

According to a further feature of the present invention, the display includes an opaque screen.

According to a further feature of the present invention, the display is a head-up display.

According to a further feature of the present invention, there is also provided a processing system associated with the display, the processing system being configured to display the image at a dynamically-moving position on the head-up display such that a viewing direction of the image for the operator is aligned with a viewing direction of the imaging sensor.

According to a further feature of the present invention, the display is a helmet-mounted display.

According to a further feature of the present invention, there is also provided a processing system associated with the display, the processing system being configured to display the image at a dynamically-moving position on the helmet-mounted display such that a viewing direction of the image for the operator is aligned with a viewing direction of the imaging sensor.

According to a further feature of the present invention, the communication link includes a wireless communication link between a missile launcher associated with the air-to-air missile and the processing system.

According to a further feature of the present invention, the processing system is configured such that, when the viewing direction of the imaging sensor lies outside the area of the helmet-mounted display, the processing system generates on the helmet-mounted display an indication visible to the pilot indicative of an angular direction of helmet movement required to bring the viewing direction of the imaging sensor within the area of the helmet-mounted display.

There is also provided, according to the teachings of the present invention, a system for providing to a pilot of an aircraft night-vision functionality derived from an imaging system of at least one air-to-air missile, the system comprising: (a) at least one air-to-air missile mounted on the aircraft, the air-to-air missile having a gimbaled imaging system including a thermal imaging tracking sensor for tracking thermal targets, the thermal imaging tracking sensor having a tracking field-of-view spanning an angle of no more than 7°; (b) a processing system in data communication with the at least one air-to-air missile; and (c) a display associated with the processing system and visible to the pilot, wherein the processing system is configured to cooperate with the imaging system of the at least one air-to-air missile in such a manner as to derive data sufficient for generating a wide-angle thermal image of a region corresponding to a field-of-view having at least one angular dimension of at least 40°, the processing system being further configured to display the wide-angle thermal image on the display to the pilot.

According to a further feature of the present invention, the imaging system includes an optical arrangement for selectively switching an effective field-of-view of the thermal imaging tracking sensor from the tracking field-of-view to a broader field of view.

According to a further feature of the present invention, the imaging system includes a second thermal imaging sensor having a field-of-view broader than the tracking field-of-view, the tracking thermal imaging sensor and the second thermal imaging sensor being mounted on a common gimbal.

According to a further feature of the present invention, the second thermal imaging sensor is a bolometric imaging sensor.

According to a further feature of the present invention, the at least one air-to-air missile is implemented as a plurality of air-to-air missiles, and wherein the processing system is operative to combine images from the imaging systems of at least two of the air-to-air missiles to generate the wide-angle thermal image.

According to a further feature of the present invention, the processing system is further configured to control the gimbaled imaging system of each of the at least two air-to-air missiles such that the imaging systems generate images of two at least partially non-overlapping regions.

According to a further feature of the present invention, the processing system is operative to cause the gimbaled imaging system to perform a scanning motion within the wide-angle field-of-view.

According to a further feature of the present invention, there is also provided a helmet to be worn by the pilot, wherein the display is a helmet mounted display associated with the helmet.

According to a further feature of the present invention, there is also provided a helmet tracking system for determining the attitude of the helmet relative to the aircraft, wherein the processing system is responsive to an output of the helmet tracking system to control the imaging system of the at least one air-to-air missile so as to derive the wide-angle thermal image for a region defined by an optical axis of the helmet.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a system and method for providing night-vision functionality to a pilot by using missile-based imaging sensors.

The principles and operation of systems and methods according to the present invention may be better understood with reference to the drawings and the accompanying description.

By way of introduction, before turning to the drawings in detail, it should be understood that a common concept underlying the various aspects of the present invention is the use of missile-based thermal imaging sensors to provide various levels of night-vision functionality to pilots of aircraft which would otherwise lack night-vision capabilities. In a first embodiment, described with reference to FIGS. 1-3, a basic level of functionality helpful for target verification is provided by minor reconfiguration of existing hardware with little or no hardware modification In a second embodiment, described with reference to FIGS. 4-11, use of a helmet-mounted-display provides enhanced situational awareness. When combined with certain cost-effective modifications of the missiles' gimbaled imaging sensor arrangement, this second embodiment preferably offers full night-vision functionality without the hardware costs and the complicated system integration required for a dedicated night-vision pod. Certain implementations of the invention, particularly those which provide transient magnification of a distant object, may also be useful as a daytime telescope, for example for magnified precision visual cueing of the missile or another weapon system, or for magnified early target verification.

Figure 1:
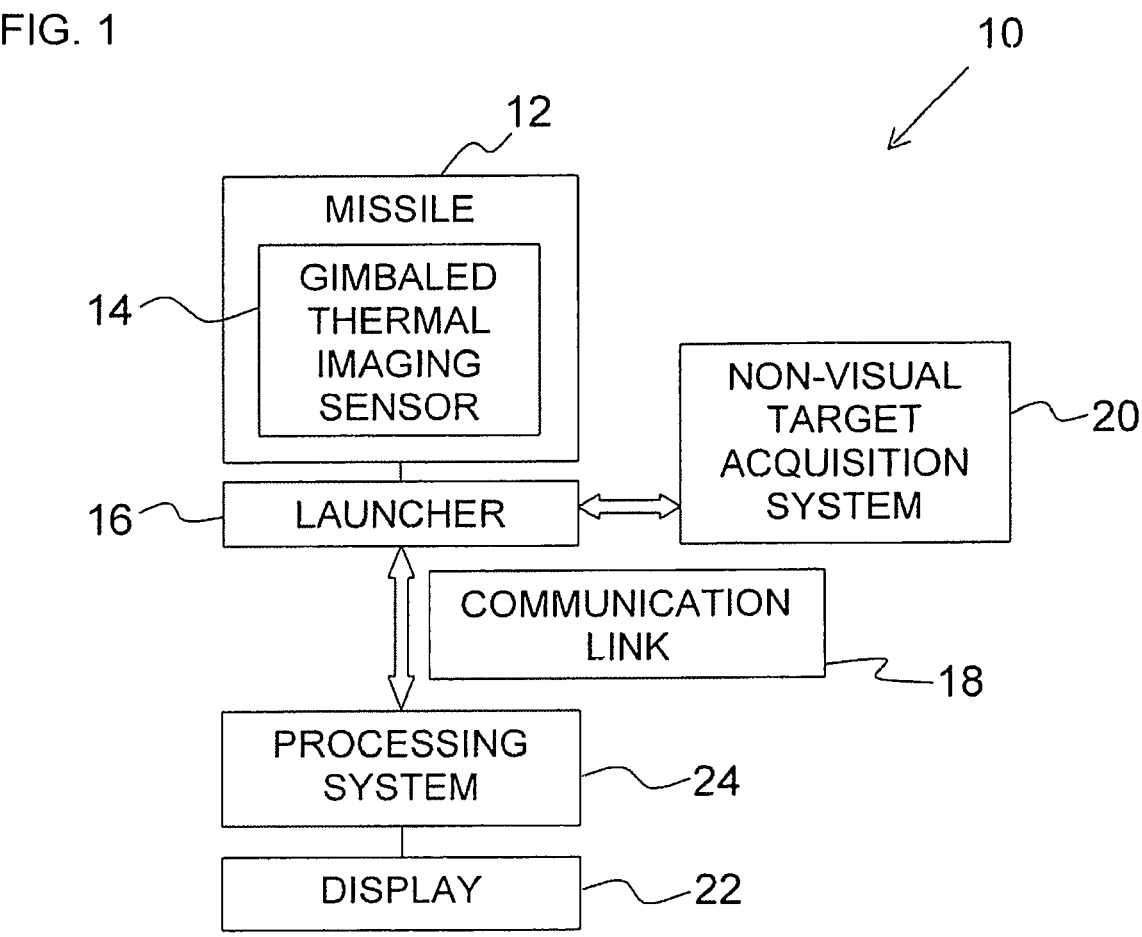
FIG. 1 is a block diagram illustrating a first system providing a basic implementation of the present invention.

Referring now to the drawings, FIG. 1 illustrates a system, generally designated 10, constructed and operative according to a first embodiment of the present invention. Generally speaking, system 10 includes an air-to-air missile 12 with a target seeker including a gimbaled imaging sensor 14. Missile 12 is typically mounted on a launcher 16 which provides communications links 18 between missile 12 and other devices via a data-bus arrangement or wirelessly. To facilitate nighttime missile operation without a full night-vision capability, the system must include a non-visual target acquisition system 20 operatively associated with missile 12 to cause the target seeker to track a target. (Alternative implementations where visual target acquisition is possible via night-vision functionality provided by the system itself will be discussed below with reference to FIGS. 4-11.) System 10 further includes a display 22, typically driven by a processing system 24, deployed so as to be visible to an operator. Communication link 18 is configured for transmitting an image derived from imaging sensor 14 to display 22 for display to the operator, thereby facilitating verification of the identity of a target currently being tracked by the missile prior to firing.

Figure 2:
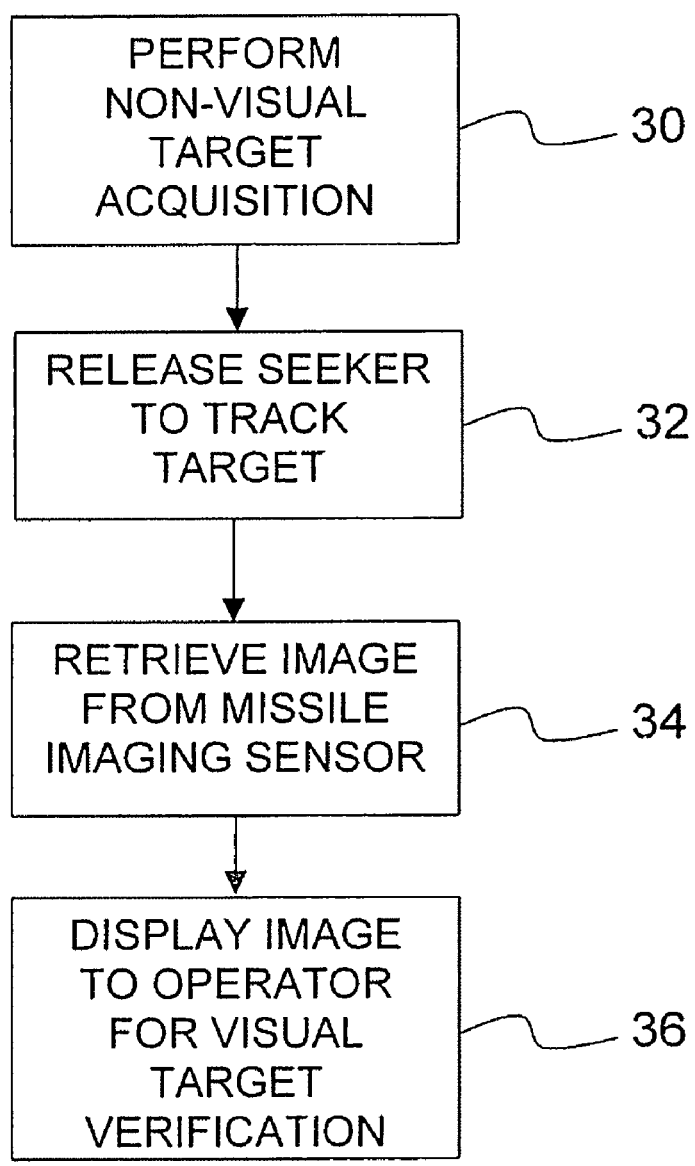
FIG. 2 is a flow diagram illustrating a basic implementation of the present invention using the system of FIG. 1.
Figure 3:
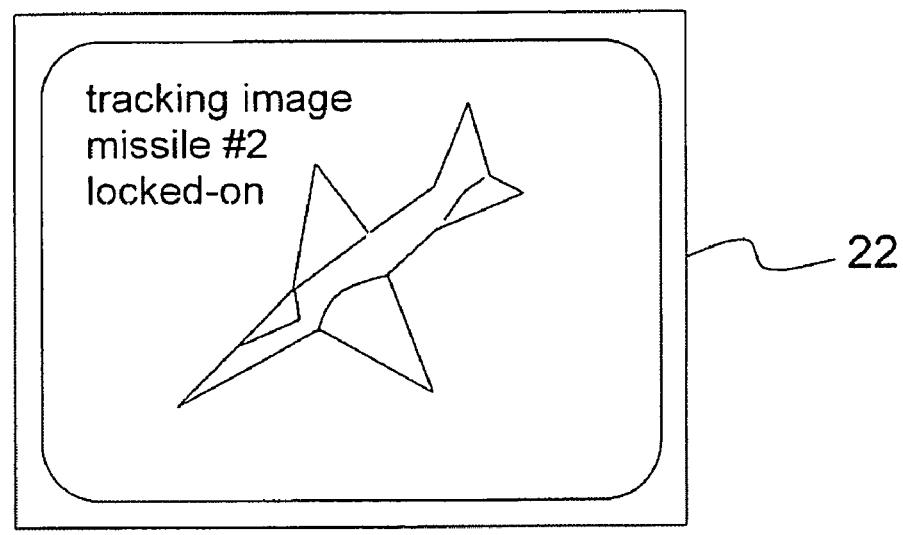
FIG. 3 is a schematic representation of a cockpit display derived from a missile-based imaging sensor according to the implementation of FIG. 2.

The operation of system 10 and the corresponding method is illustrated in FIG. 2. Specifically, after non-visual target acquisition (step 30) and release of the missile seeker to track the target (step 32), the system retrieves an image from the missile's thermal imaging sensor (step 34) and displays the image to the operator for visual target verification (step 36). An example of a typical cockpit display image generated by the system and method of FIGS. 1 and 2 is shown in FIG. 3.

It will immediately be appreciated that system 10 and the corresponding method provide a highly effective solution to the aforementioned problem of nighttime target verification. Specifically, by displaying the image from the missile's imaging sensor on a display visible to the pilot, target verification can be performed instantly and easily from a visual image in the same intuitive manner in which it is performed by day without requiring installation of any dedicated night vision equipment. This and other advantages of the present invention will be better understood from the following description.

It will be helpful at this point to define certain terminology as used herein in the description and claims. Firstly, certain implementations of the present invention, particularly in the absence of full night-vision functionality, relate to cases where "non-visual target acquisition" is used. The term "non-visual" in this context is used to refer to a target acquisition system or procedure which employs any technique other than alignment of a cuing system with a target seen by the pilot. In other words, "visual target acquisition" refers to a procedure where an operator aligns a device or symbol with a target which is either viewed directly or displayed as an image, typically spatially aligned with the position of the target. Any and all other target acquisition procedures are referred to as "non-visual target acquisition". Preferred examples of non-visual target acquisition techniques for use with the present invention include, but are not limited to: transfer of a target direction from a radar system to the air-to-air missile; an autonomous scanning process performed by the missile (such as is described in U.S. Pat. No. 6,789,763); and use of target location data provided via a wireless communication link ("Datalink") from outside the aircraft Accordingly, target acquisition system 20 may include a radar system, a target acquisition module associated with the missile for actuating the seeker to perform an autonomous search pattern for a target and/or a wireless data link providing target data from a source outside the aircraft.

The term "display" as used herein in the description and claims refers to any device for providing visible light to the human eye in such a manner as to generate a real or perceived image Thus the display may be an opaque (i.e., non-see-through) display such as a cockpit-mounted CRT or LCD panel display, or a see-through display such as a cockpit-mounted head-up display (HUD) or a helmet-mounted display (HMD) Furthermore, the display may be a screenless display such as a retinal projection system. The display may be monochrome or color, and is preferably capable of generating or simulating multiple intensity levels in order to properly represent a gray-scale or color image.

In certain preferred implementations of the system 10, communication link 18 includes a wireless communication link between missile launcher 16 and processing system 24. In this case, processing system 24 and display 22 may be a stand-alone device similar to a wireless-enabled hand-held computer or Palm®, thereby allowing implementation of the system with minimal integration into the aircraft electronic systems.

Figure 4:
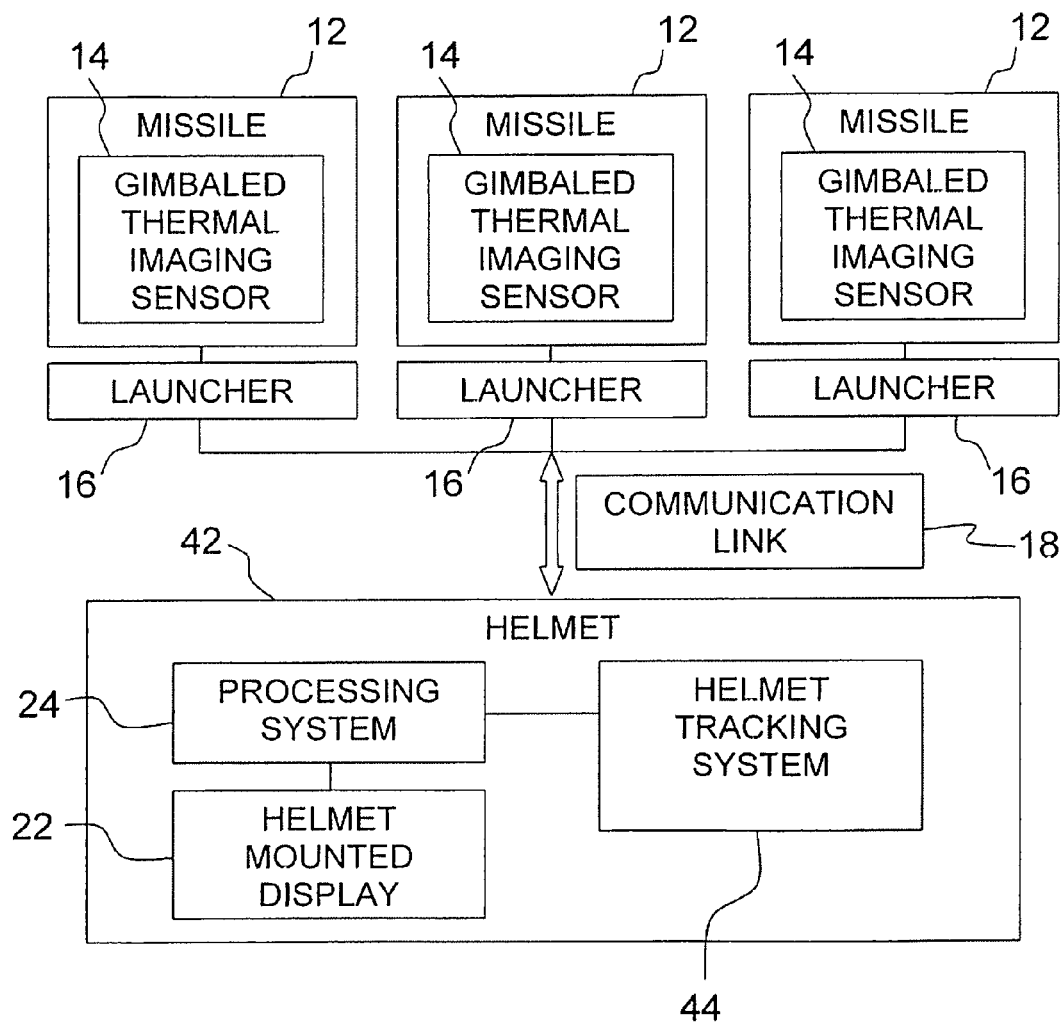
FIG. 4 is a block diagram illustrating a preferred system, constructed and operative according to the teachings of the present invention, for providing a second preferred implementation of the present invention.

Turning now to FIG. 4, this shows a particular implementation of system 10, here designated 40, wherein display 22 is implemented as a helmet-mounted display (HMD) associated with a helmet 42 having a helmet tracking system 44. Non-visual target acquisition system 20 (not shown here) may be used, but is typically not necessary due to increased functionality of this implementation as will be detailed below. This implementation may also interact as shown here with multiple missiles 12 to provide additional or enhanced functionality, as will be mentioned below. In all other respects, system 40 is equivalent to system 10 described above and equivalent elements are labeled similarly. This implementation of the present invention with a see-through display, and most preferably a HMD, provides additional levels of functionality as will be described below with reference to FIGS. 5-7.

In structural terms, helmet systems with helmet-mounted displays are well known in the art and are commercially available from various sources. For implementations of the present invention, the HMD preferably has capabilities of displaying or emulating a grayscale image and preferably overlaps a significant proportion of the pilot's field of view including the optical axis ("straight ahead") of the helmet. Helmet tracking system 44 provides data used by processing system 24 for spatial alignment of images displayed on the HMD with corresponding objects or positions in real space. By way of one non-limiting example, the present invention may be implemented effectively using the "Nomad" HMD manufactured by Microvision Inc. (USA) and deployed by US armed forces. In a more preferred case, a lightweight helmet system such as disclosed in Israel Patent Application No. 159061, hereby incorporated by reference in its entirety, may be combined to advantage with a lightweight see-through display such as is commercially available from Lumus Ltd. (Israel).

Here too, communication link 18 is preferably a wireless communication link, thereby facilitating a minimally-integrated implementation which does not require full integration with aircraft electronic systems.

Before addressing the various modes of operation of system 40 in detail, it will be useful to describe in general terms the fundamental advantages offered by the HMD implementation of the present invention. Particularly, by determining (causally or by sensing) a current viewing direction of imaging sensor 14 associated with an image from the imaging sensor and combining this information with the helmet orientation, it is possible to present the sampled image on the HMD spatially aligned with the target itself, effectively turning the imaging sensor of each missile into a small night-vision pod. While the missile seeker is freely tracking a target, the result is a floating window showing an image of the tracked target spatially-aligned with the target's current position. In addition to allowing target verification, this contributes greatly to the pilot's spatial awareness of his combat situation since he sees clearly the position of the tracked target in three-dimensional space around him. When the missile is not currently tracking a target, the imaging sensor may be slaved to the optical axis of the helmet, thereby providing head-steerable night vision. Preferred implementations of these two modes of operation will now be described with reference to FIGS. 5-11.

Turning now to FIGS. 5 and 6A-6D, these illustrate a first preferred mode of operation, and corresponding method according to the teachings of the present invention, for implementation using the system 40. This mode of operation is intended for, and may be actuated automatically in response to, locking-on of a missile to a target. This locking-on is illustrated here as a step of acquiring a target (step 50) and releasing the seeker of the missile to track the target autonomously (step 52). The method then proceeds with retrieval via communication link 18 of an image from imaging sensor 14 (step 54) and retrieval of the corresponding missile seeker line-of-sight (step 56) These calculations are most simply performed in a frame of reference moving together with the aircraft, although other reference frames such as a geo-stationary frame of reference may be used. Helmet tracking system 44 also allows derivation of the helmet line-of-sight (step 58). This information is then used by processing system 24 in step 60 to determine the corresponding spatially aligned location on the HMD for displaying the retrieved image. Then, assuming the display location lies within the field-of-view of the HMD (condition 62), the image is then displayed on the HMD as a floating image (step 64). The term "floating image" is used here to denote that the image is displayed at a dynamically-moving position on the helmet-mounted display such that a viewing direction of the image for the operator is aligned with a viewing direction of the imaging sensor. Thus the image, which is relatively small compared to the HMD angular coverage due to the small FOV of the sensor, moves across the HMD as a function of both the current missile gimbal direction and the current helmet attitude. This functionality is illustrated schematically in FIGS. 6A and 6B where the floating image 72 of a moving target is displayed in different positions on the angular field of view 74 or the HMD as the target moves relative to the helmet attitude. Although the rest of the pilot's field of view at night may be dark, limited to what can be seen directly under the ambient lighting conditions, the pilot sees clearly the identity and position of the tracked target(s), facilitating real time decision making as to the nature of each target and the required course of action. This mode may operate simultaneously with multiple floating images corresponding to targets tracked by separate missiles at the same time. Each floating image remains aligned with the corresponding tracked target substantially independent of the helmet attitude, so long as the viewing direction does not stray outside the region covered by the HMD.

According to a further preferred feature of the present invention, in the case that step 62 determines that the viewing direction of the imaging sensor lies outside the area of the helmet-mounted display, processing system 24 generates on the helmet-mounted display an indication 76 (FIG. 6C) visible to the pilot indicative of an angular direction of helmet movement required to bring the viewing direction of the imaging sensor within the area of the helmet-mounted display. Most preferably, indication 76 may include also an indication of the angular displacement required to bring the imaging sensor viewing direction, and hence the floating image, to a (typically central) position within the angular region covered by the HMD. Thus, in the example illustrated here, a flashing symbol in the central region of the display indicates that the tracked target is currently 60° from the helmet optical axis in a direction indicated by the accompanying arrow symbol. This further contributes to the pilot's situational awareness as well as informing him which way to turn his head in order to see floating image 74.

According to further preferred feature of this mode of operation, the pilot is provided with an input device, typically in the form of a standard multifunction input device on a control stick (not shown), to actuate transient image enlargement. Thus, referring again to FIG. 5, the method checks at step 68 whether the pilot has actuated an image enlarge request. On receipt of such a request, processing system 24 temporarily generates an enlarged (and optionally also centered) display 78 (FIG. 6D) of at least part of the tracked image on helmet-mounted display 22 (step 70), thereby facilitating target verification. It will be appreciated that the image from thermal imaging sensor 14, although corresponding to a small angular FOV, is typically at high enough resolution to offer a high quality enlarged image, typically magnified by a factor of between 3 and 30, and preferably by a factor in the range of 5 to 10. This allows identification or verification of the tracked target significantly earlier than could be achieved with an unmagnified image. Furthermore, in the case of a target lying outside the current field of view of the HMD, the option of displaying a transient image of the target centered in the HMD field of view allows target verification without the pilot needing to turn his or her head sufficiently to face the tracked target.

Parenthetically, it may be noted that the proposed enlargement and centering of the missile imaging sensor image in the HMD may be considered in contradiction to the widely accepted thinking in the art which teaches away from displaying any image on a HMD other than a 1:1 image aligned with the real world. The present invention indeed recognizes that display of images which are disproportionate to the real world objects and/or out of alignment with the physical surroundings could potentially be dangerously disorientating to the pilot. Nevertheless, in the case of the transient image enlargement feature, since the enlargement is initiated voluntarily by the pilot and is only displayed in a transient manner, the brief interruption to the real-world-orientation operation of the display is not considered dangerous. The HMD preferably returns to its normal 1:1 mode of operation either automatically at the end of a predefined brief period (typically no more than one second) or voluntarily as soon as the pilot releases active pressure on the actuator employed to make an image enlarge request.

In the absence of an image enlarge request at step 68, or on termination of the enlarged image display, the operation returns to its normal sequence from step 54 onwards and repeats the operation until tracking ceases, either by user cancellation or by launch of the missile.

Figure 7:
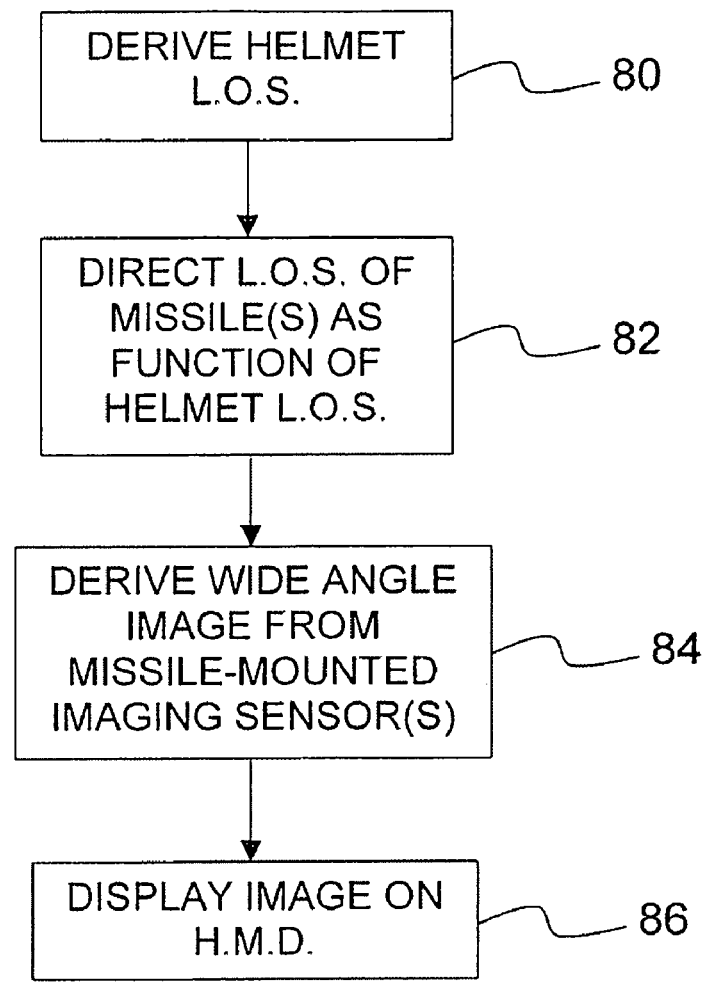
FIG. 7 is a flow diagram illustrating a second preferred mode of operation of the system of FIG. 4.

Turning now to FIG. 7, there is illustrated a second preferred mode of operation of system 40 of FIG. 4. This mode, which may operate alternately or simultaneously with the mode of FIG. 5, employs at least one gimbaled thermal imaging sensor 14 which is not currently tracking a target to provide nightvision pod functionality as will now be described. Thus, referring to FIG. 7, at step 80, processing system 24 derives from the helmet tracking system 44 the helmet attitude, or more precisely, the optical axis or line-of-sight (LOS) of the helmet. Then, at step 82, the line-of-sight of the imaging sensor 14 of at least one missile is directed as a function of the helmet LOS. At step 84, processor 24 derives a wide angle (at least 40°) image from at least one missile-mounted imaging sensor (to be discussed further below), and at step 86, this wide angle image is displayed on the HMD correctly scaled and oriented so as to be a correct representation of the surroundings as viewed by the pilot It will be noted that the main technical obstacle to providing nightvision pod functionality based on the gimbaled imaging system of an air-to-air missile is the limited field of view Specifically, thermal imaging sensor 14 of an air-to-air missile typically has a tracking field-of-view spanning an angle of no more than 7°. To be useful as a general-purpose night-vision system, the system must provide an effective field of view spanning at least about 40° in one direction (typically breadth). To this end, processing system 24 is configured according to this mode to cooperate with the missile imaging system, through special algorithms and/or hardware modification, in such a manner as to derive data sufficient for generating a wide-angle thermal image of a region corresponding to a field-of-view having at least one angular dimension of at least 40° for display on display 22. A number of options for providing such a wide angle FOV will now be discussed with reference to FIGS. 8A-11.

Referring first collectively to FIGS. 8A-10, these relate to modifications of the missile seeker hardware which enable the existing cooled thermal imaging array 90 to be switched between two optical arrangements, a first optical arrangement 92 which provides the "normal" narrow FOV for tracking functions and a second optical arrangement 94 which provides the wide FOV required for the nightvision pod functionality. Thus, each of these implementations includes an optical switching arrangement for selectively switching an effective field-of-view of the thermal imaging tracking sensor from the tracking field-of-view to a broader field of view. The use of a single cooled imaging array with field-of-view switching provides both compactness and cost savings compared to doubling up of the entire imaging hardware. Since the wide FOV optics is typically much more compact than the narrow FOV optics, it is generally feasible to add the required additional components on the standard gimbal arrangement and within the existing packaging constraints of the missile body.

Figure 8A:
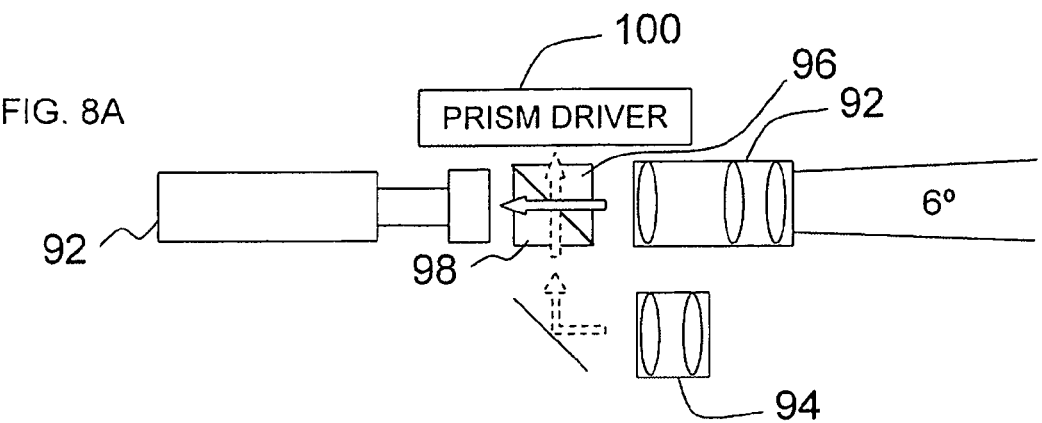
FIGS. 8A and 8B illustrate a first preferred gimbaled imaging sensor arrangement for use in the system of FIG. 4 shown switched to a narrow-field-of-view state and wide-field-of-view state, respectively.
Figure 8B:
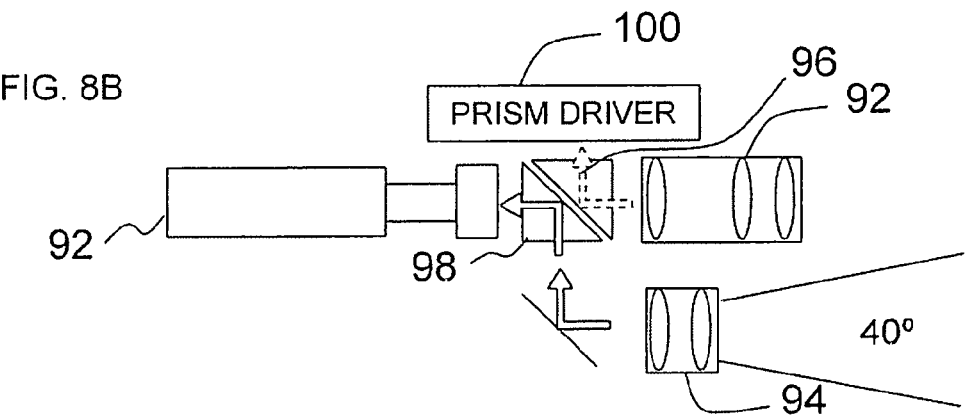

In the case of FIGS. 8A and 8B, the optical switching mechanism includes a pair of prisms 96, 98 and a prism displacement driver mechanism 100 operative to displace at least one of prisms 96, 98 such that the prisms are alternately adjacent (as in FIG. 8A) to provide a substantially transparent state in which total internal reflection is frustrated and apart (as in FIG. 8B) to provide a substantially reflective state by total internal reflection. This achieves switching between the narrow FOV (FIG. 8A) and the wide FOV (FIG. 8B).

Figure 9A:
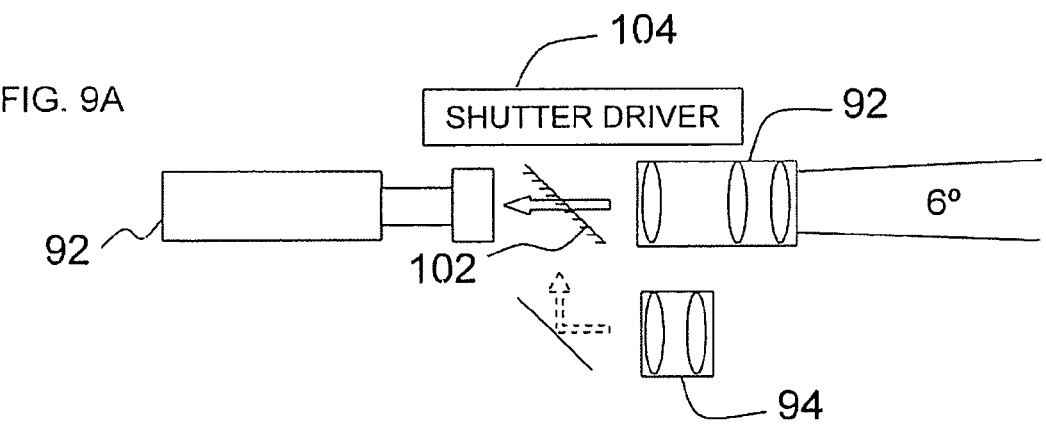
FIGS. 9A and 9B illustrate a second preferred gimbaled imaging sensor arrangement for use in the system of FIG. 4 shown switched to a narrow-field-of-view state and wide-field-of-view state, respectively.
Figure 9B:
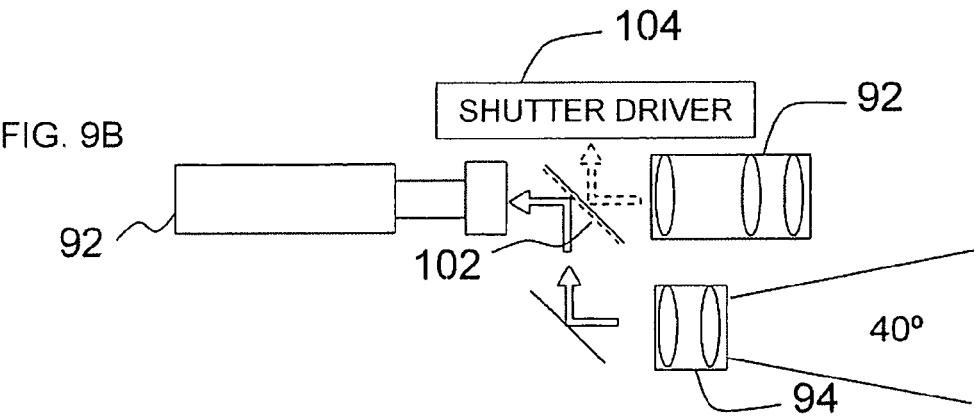

Turning now to FIGS. 9A and 9B, there is shown schematically an alternative implementation of optical switching mechanism including a plurality of reflective micro-electro-mechanical shutters 102 driven by a shutter driver system 104. In this case, the mechanism is substantially transparent when shutters 102 are open (FIG. 9A) and substantially reflective when shutters 102 are closed (FIG. 9B). Such a mechanism can be implemented using, for example, the technology described in PCT publication no. WO02/13168. Suitable micro-electromechanical shutter elements are commercially available from Flixel Ltd., (Tel Aviv, Israel).

Figure 10:
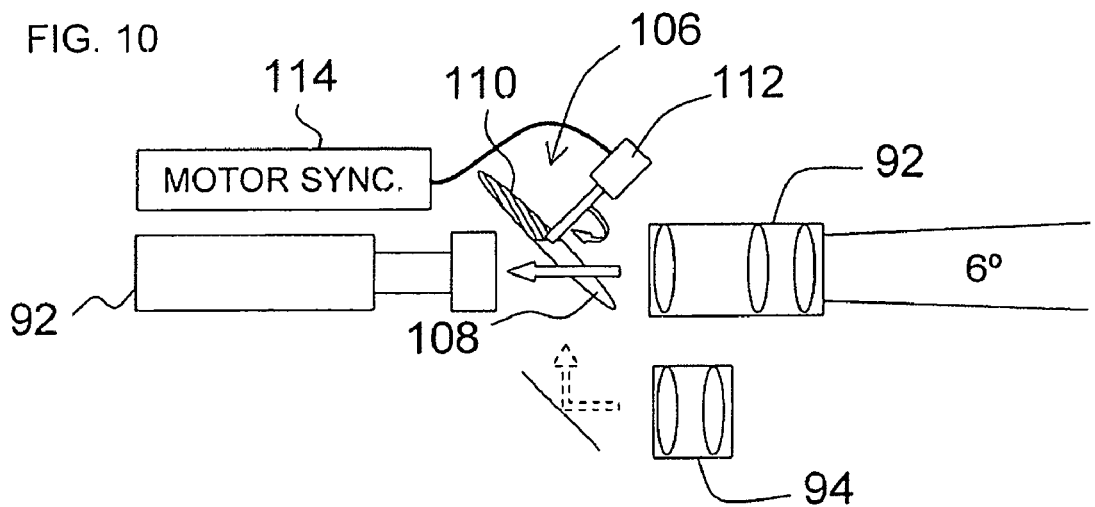
FIG. 10 illustrates a third preferred gimbaled imaging sensor arrangement for use in the system of FIG. 4 to provide switchable or alternating narrow-field-of-view and wide-field-of-view images.

Turning now to FIG. 10, this shows a further option for implementing an optical switching mechanism based upon a rotatable disk 106 including at least one pair of alternating segments, a first segment 108 of each pair being transparent and a second segment 110 of each pair being reflective. The disk is preferably driven by a synchronous electric motor, servo motor or step motor 112 with appropriate drive circuitry 114 as is known in the art of electrical actuators. Alternatively, a linear or rotary actuator may be used to displace a mirror element into and out of the optical path for low-frequency switching to achieve a similar result.

In each of the above cases, switching between the two fields-of-view is typically performed on-demand in response to a switching signal generated by processing system 24 when the wide FOV night-vision functionality is required by the user. Alternatively, at least while operating in the night-vision mode, the switching may be performed continuously synchronized with the frame sampling rate such that the missile alternately outputs frames of both the narrow and wide fields-of-view during continuous operation.

Figure 11:
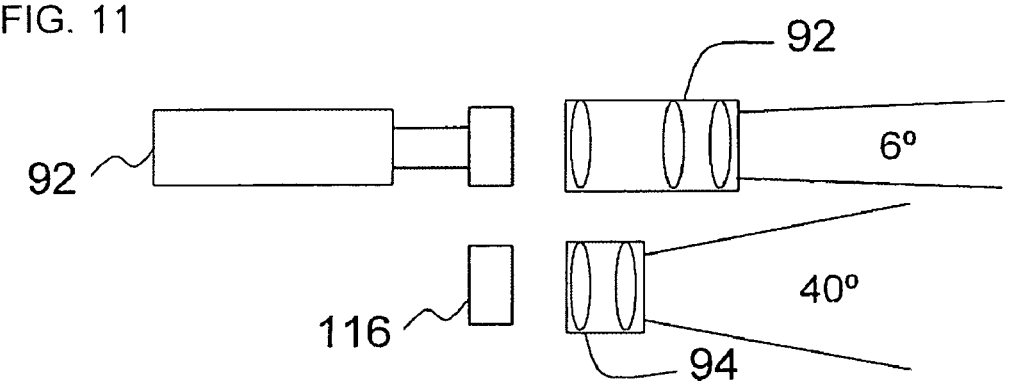
FIG. 11 illustrates a fourth preferred gimbaled imaging sensor arrangement including a secondary wide-field-of-view imaging sensor.

Turning now to FIG. 11, this illustrates an alternative approach to the hardware modification of the missile in which the imaging system includes a second thermal imaging sensor 116, mounted on a common gimbal with the tracking imaging sensor 90, and having a field-of-view broader than the tracking field-of-view. Most preferably, thermal imaging sensor 116 is an uncooled bolometric imaging sensor, thereby rendering the additional components relatively low in cost and highly compact.

As an alternative to, or more preferably in addition to, hardware modification of the missile imaging systems, various algorithms are preferably used for driving the imaging sensor(s) and performing various image processing operations to further enhance the wide FOV capabilities of the system of the present invention. Specifically, according to one preferred feature of the present invention, processing system 24 is operative to combine images from the imaging systems of at least two missiles 12 to generate the wide-angle thermal image. Most preferably, processing system 24 controls gimbaled imaging system 14 of each of the at least two air-to-air missiles such that the imaging systems generate images of two at least partially non-overlapping regions. Thus, if each missile using one of the hardware modifications discussed above provides a FOV of 40°×40°, two imaging systems can be directed to angles 20° on either side of the current optical axis of the helmet to provide the pilot with nightvision having an angular FOV approaching 80°. Similarly, three or four missile sensor images (even of smaller individual FOVs) can be combined to generate a patchwork of images to be combined as a single larger FOV.

According to a further option, processing system 24 is operative to cause at least one gimbaled imaging system 14 to perform a scanning motion within the wide-angle field-of-view. This approach allows even a relatively small FOV sensor to be used to build up the required wide-angle FOV for nightvision functionality, albeit at a significantly lower refresh rate than would be provided by a staring wide-angle sensor. Nevertheless, since the image may be displayed continuously and pained across the HMD 22 in real-time to maintain correct alignment with the outside world, a refresh rate for the content of the image of half a second or even more would still render the nightvision function of great value to the pilot. In the case where a target is being tracked, the tracking image is preferably shown as a floating window (according to the mode of FIGS. 5, 6A and 6B) superimposed over the general nightvision view. This offers continuous real-time imagery of a possibly fast-moving target, thereby circumventing problems which could result from the slower refresh rate of the background image.

Figure 5:
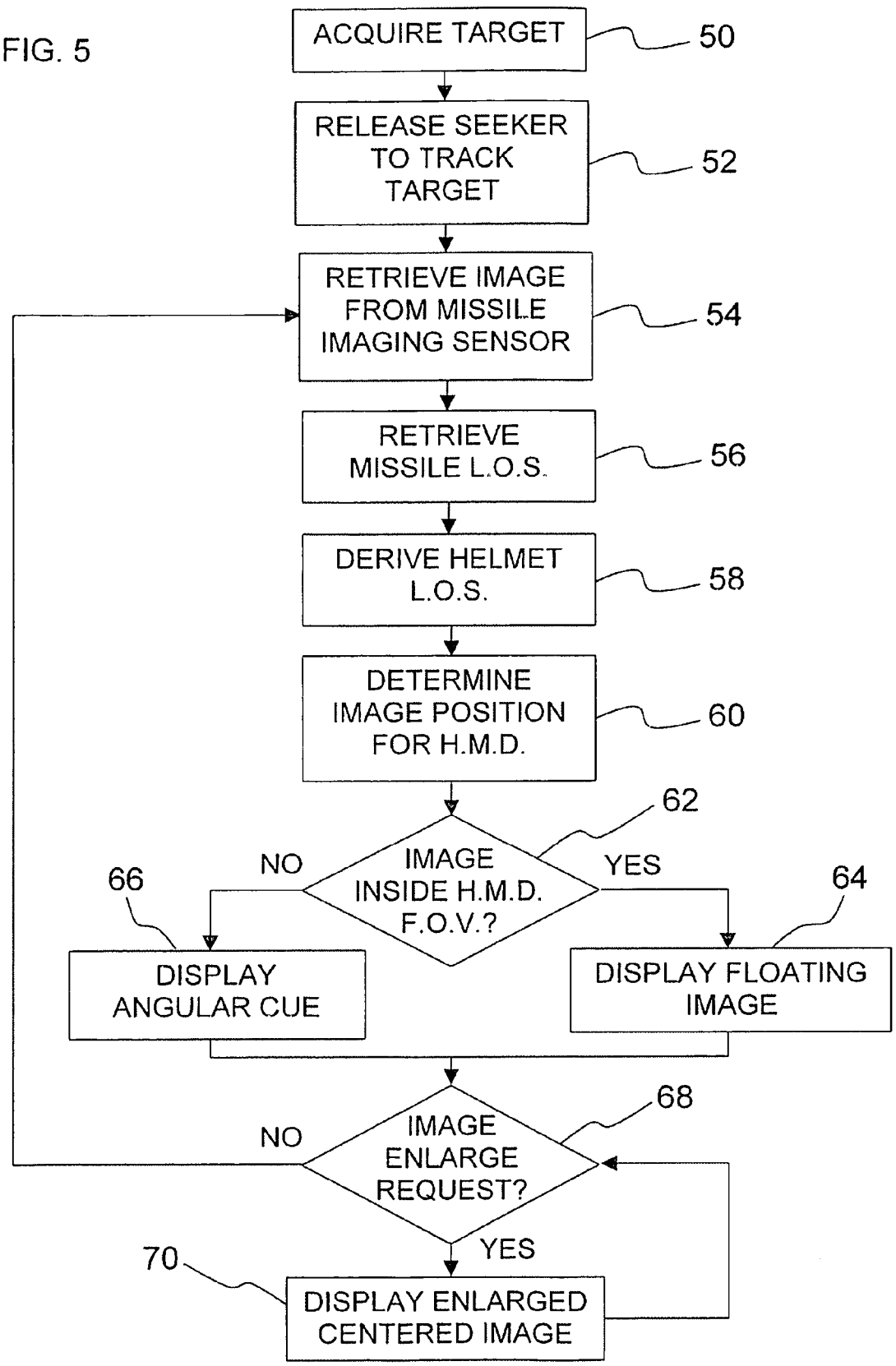
FIG. 5 is a flow diagram illustrating a first preferred mode of operation of the system of FIG. 4.
Figure 6A:
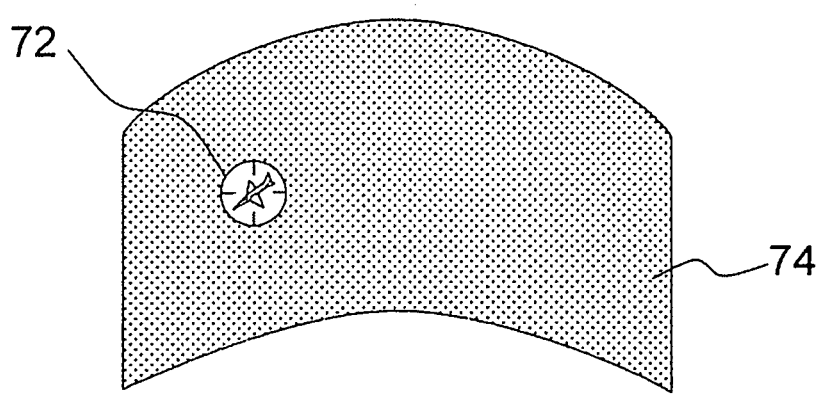
FIGS. 6A-6D are representations of a helmet mounted display viewed during various stages of the mode of operation of FIG. 5.
Figure 6B:
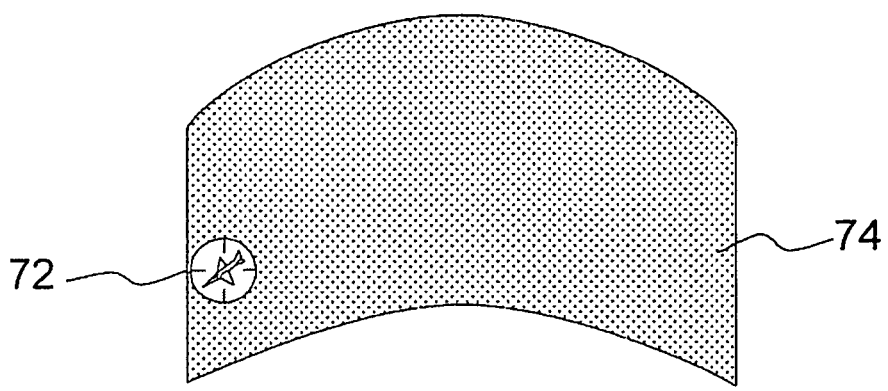
Figure 6C:
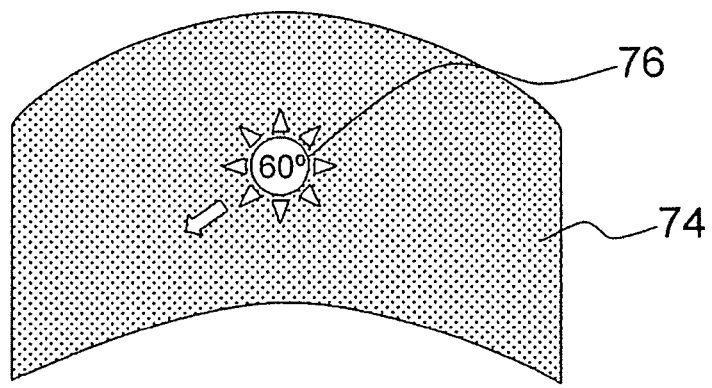
Figure 6D:
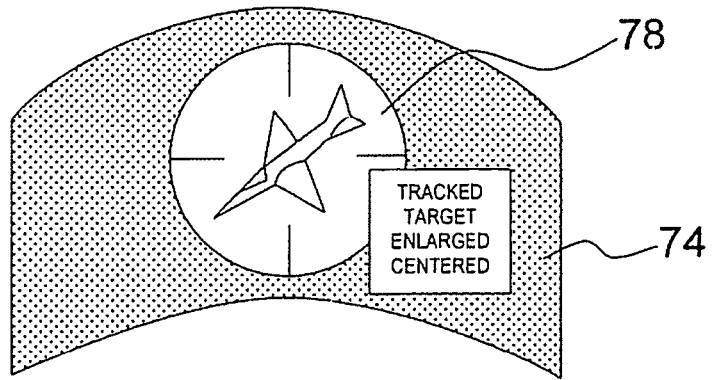

In more general terms, it should be noted that the modes of FIG. 5 and FIG. 7 may operate alternately. In this case, switching to the mode of FIG. 5 preferably occurs automatically on actuation of target tracking by a missile and the system automatically returns to the mode of FIG. 7 on cancellation of the tracking or launch of the missile. Alternatively, as illustrated by the previous example, the two modes may operate concurrently, with the floating image of the tracked target designated by use of a distinct color and/or by use of a marker symbol (such as shown in FIGS. 6A and 6B).

Clearly, the number of missiles available to the system for deriving images may vary dynamically during operation due to firing of one or more missile. The system is therefore preferably configured to dynamically and seamlessly change the mode of operation and available options as dictated by the currently available resources. Thus, the system may initially operate with the modes of FIGS. 5 and 7 running concurrently and then switch to alternating operation if the number of available missiles is reduced. Similarly, the system may initially operate with multiple staring sensors to build the wide FOV display, subsequently either changing the geometric pattern of sensor overlap or switching instead to a scanning mode when the number of sensors becomes insufficient.

It will be understood that the above description is exemplary of a particular preferred implementation of the present invention, but that many other implementations and/or additional functionality may be added with the scope of the teachings of the present invention. By way of example, it should be noted that the capability of seeing an image from the missile's point of view may provide important functionality also during daylight use. For example, the pilot may be able to use the system of the present invention to look inwards at the outer surface of his own aircraft, for example to assess external damage to the aircraft body etc. According to a further option, images from missiles on opposite wings may be displayed separately to the two eyes of the pilot to provide an enhanced stereoscopic view with enhanced depth perception.

It will be appreciated that the above descriptions are intended only to serve as examples, and that many other embodiments are possible within the scope of the present invention as defined in the appended claims.

What is claimed is:

1. A method for improving nighttime visual awareness of a pilot flying an aircraft carrying an air-to-air missile including at least one gimbaled imaging sensor, the method comprising:
   (a) providing:
      (i) a helmet for the pilot,
      (ii) a helmet tracking system for determining the attitude of the helmet relative to the aircraft, and
      (iii) a helmet-mounted display;
   (b) determining a current imaging sensor viewing direction of the imaging sensor of the air-to-air missile;
   (c) sampling an image of an object from the imaging sensor of the air-to-air missile; and
   (d) displaying the image on the helmet-mounted display, wherein said determining and said displaying are performed such that the image displayed on the helmet-mounted display as viewed by the pilot is substantially spatially aligned with the object.

2. The method of claim 1, wherein, at least in a first mode of operation, the image is displayed at a dynamically-moving position on the helmet-mounted display such that a viewing direction of the image for the pilot is aligned with the imaging sensor viewing direction substantially independent of the attitude of the helmet.

3. The method of claim 2, wherein said first mode image is selectively actuated while the air-to-air missile is tracking a target.

4. The method of claim 2, further comprising, when the viewing direction of the imaging sensor lies outside the area of the helmet-mounted display, generating on the helmet-mounted display an indication visible to the pilot indicative of an angular direction of helmet movement required to bring the viewing direction of the imaging sensor within the area of the helmet-mounted display.

5. The method of claim 2, further comprising, responsive to an actuation signal from the pilot, temporarily generating an enlarged display of at least part of said image on the helmet-mounted display to facilitate target verification.

6. The method of claim 1, wherein, at least in a second mode of operation, said determining is achieved by driving a gimbal mechanism of the air-to-air missile such that the viewing direction of the imaging sensor is adjusted as a function of the attitude of the helmet.

7. The method of claim 1, wherein the method selectively operates:
   (a) in a first mode of operation wherein the image is displayed at a dynamically-moving position on the helmet-mounted display such that a viewing direction of the image for the pilot is aligned with the imaging sensor viewing direction substantially independent of the attitude of the helmet; and
   (b) in a second mode of operation wherein said determining is achieved by driving a gimbal mechanism of the air-to-air missile such that the viewing direction of the imaging sensor is adjusted as a function of the attitude of the helmet.

8. The method of claim 7, further comprising switching responsive to a lock-on signal from the air-to-air missile from said second mode to said first mode.

9. The method of claim 1, wherein said image is transmitted wirelessly from a missile launcher associated with said air-to-air missile to a processing system associated with said helmet-mounted display.

10. A system for improving nighttime visual awareness of a pilot flying an aircraft, the system comprising:
   (a) at least one air-to-air missile mounted on the aircraft, said air-to-air missile including at least one gimbaled imaging sensor;
   (b) a helmet worn by the pilot;
   (c) a helmet tracking system deployed for determining the attitude of the helmet relative to the aircraft;
   (d) a helmet-mounted display associated with the helmet;
   (e) a processing system for controlling the helmet-mounted display;
   (f) a communication link associated with said air-to-air missile and said processing system for transmitting to the processing system an image of an object sensed by said imaging sensor,
wherein said processing system is configured to control said helmet-mounted display to display at least part of said image such that the display as viewed by the pilot is substantially spatially aligned with the object.

11. The system of claim 10, wherein said processing system is selectively operative to display the image from the imaging sensor at a dynamically-moving position on the helmet-mounted display such that a viewing direction of the image for the pilot is aligned with the imaging sensor viewing direction.

12. The system of claim 10, wherein said processing system is operative to selectively display said image while said air-to-air missile is tracking a target.

13. The system of claim 10, wherein said communication link is implemented as a wireless communication link from a missile launcher associated with said air-to-air missile to said processing system.

14. The system of claim 10, wherein said processing system is further operative: (a) to determine whether the viewing direction of the imaging sensor lies outside the area of the helmet-mounted display; and (b) when the viewing direction of the imaging sensor lies outside the area of the helmet-mounted display, to generate on the helmet-mounted display an indication visible to the pilot indicative of an angular direction of helmet movement required to bring the viewing direction of the imaging sensor within the area of the helmet-mounted display.

15. A method for nighttime control of an air-to-air missile with a gimbaled imaging sensor, the method comprising:

(a) performing non-visual target acquisition so that the air-to-air missile acquires a target for tracking by the air-to-air missile; and (b) displaying to an operator an image sensed of an object by the imaging sensor of the air-to-air missile for visual target verification, wherein said image is displayed at a dynamically-moving position on a head-up display such that a viewing direction of the image for the pilot is aligned with the object.

16. The method of claim 15, wherein said non-visual target acquisition is performed by transfer of a target direction from a radar system to the air-to-air missile.

17. The method of claim 15, wherein said non-visual target acquisition is performed autonomously by a scanning process performed by the missile.

18. The method of claim 15, wherein said non-visual target acquisition is performed by use of target location data provided via a wireless communication link from outside the aircraft.

19. A method for nighttime control of an air-to-air missile with a gimbaled imaging sensor, the method comprising:

(a) performing non-visual target acquisition so that the air-to-air missile acquires a target for tracking by the air-to-air missile; and (b) displaying to an operator an image sensed by the imaging sensor of the air-to-air missile for visual target verification, wherein said image is displayed on a helmet-mounted display, and wherein said image is transmitted wirelessly from a missile launcher associated with said air-to-air missile to a processing system associated with said helmet-mounted display.

20. A method for nighttime control of an air-to-air missile with a gimbaled imaging sensor, the method comprising:

(a) performing non-visual target acquisition so that the air-to-air missile acquires a target for tracking by the air-to-air missile; and (b) displaying to an operator an image sensed by the imaging sensor of the air-to-air missile for visual target verification, wherein said image is displayed on a helmet-mounted display, and wherein said image is displayed at a dynamically-moving position on the helmet-mounted display such that a viewing direction of the image for the pilot is aligned with the imaging sensor viewing direction.

21. The method of claim 20, further comprising, when the viewing direction of the imaging sensor lies outside the area of the helmet-mounted display, generating on the helmet-mounted display an indication visible to the pilot indicative of an angular direction of helmet movement required to bring the viewing direction of the imaging sensor within the area of the helmet-mounted display.

22. A system for nighttime control of an air-to-air missile with a gimbaled imaging sensor, the system comprising:

(a) an air-to-air missile with a target seeker including a gimbaled imaging sensor;

(b) a non-visual target acquisition system operatively associated with said missile to cause the target seeker to acquire the target for tracking by the target seeker;

(c) a display deployed so as to be visible to an operator; and (d) a communication link deployed for transmitting an image derived from said imaging sensor to said display for display to the operator.

23. The system of claim 22, wherein said target acquisition system includes a radar system.

24. The system of claim 22, wherein said target acquisition system includes a target acquisition module associated with said missile for actuating said seeker to perform an autonomous search pattern for a target.

25. The system of claim 22, wherein said target acquisition system includes a wireless data link providing target data from a source outside the aircraft.

26. The system of claim 22, wherein said display includes an opaque screen.

27. The system of claim 22, wherein said display is a head-up display.

28. The system of claim 27, further comprising a processing system associated with said display, said processing system being configured to display said image at a dynamically-moving position on the head-up display such that a viewing direction of the image for the operator is aligned with a viewing direction of said imaging sensor.

29. The system of claim 22, wherein said display is a helmet-mounted display.

30. The system of claim 29, further comprising a processing system associated with said display, said processing system being configured to display said image at a dynamically-moving position on the helmet-mounted display such that a viewing direction of the image for the operator is aligned with a viewing direction of said imaging sensor.

31. The system of claim 30, wherein said communication link includes a wireless communication link between a missile launcher associated with said air-to-air missile and said processing system.

32. The system of claim 30, wherein said processing system is configured such that, when the viewing direction of the imaging sensor lies outside the area of the helmet-mounted display, said processing system generates on the helmet-mounted display an indication visible to the pilot indicative of an angular direction of helmet movement required to bring the viewing direction of the imaging sensor within the area of the helmet-mounted display.

33. A system for providing to a pilot of an aircraft night-vision functionality derived from an imaging system of at least one air-to-air missile, the system comprising:

(a) at least one air-to-air missile mounted on the aircraft, said air-to-air missile having a gimbaled imaging system including a thermal imaging tracking sensor for tracking thermal targets, said thermal imaging tracking sensor having a tracking field-of-view spanning an angle of no more than 7°;

(b) a processing system in data communication with said at least one air-to-air missile; and (c) a display associated with said processing system and visible to the pilot, wherein said processing system is configured to cooperate with said imaging system of said at least one air-to-air missile in such a manner as to derive data sufficient for generating a wide-angle thermal image of a region corresponding to a field-of-view having at least one angular dimension of at least 40°, said processing system being further configured to display said wide-angle thermal image on said display to the pilot.

34. The system of claim 33, wherein said imaging system includes an optical arrangement for selectively switching an effective field-of-view of said thermal imaging tracking sensor from said tracking field-of-view to a broader field of view.

35. The system of claim 33, wherein said imaging system includes a second thermal imaging sensor having a field-of-view broader than said tracking field-of view, said tracking thermal imaging sensor and said second thermal imaging sensor being mounted on a common gimbal.

36. The system of claim 35, wherein said second thermal imaging sensor is a bolometric imaging sensor.

37. The system of claim 33, wherein said at least one air-to-air missile is implemented as a plurality of air-to-air missiles, and wherein said processing system is operative to combine images from said imaging systems of at least two of said air-to-air missiles to generate said wide-angle thermal image.

38. The system of claim 37, wherein said processing system is further configured to control said gimbaled imaging system of each of said at least two air-to-air missiles such that said imaging systems generate images of two at least partially non-overlapping regions.

39. The system of claim 33, wherein said processing system is operative to cause said gimbaled imaging system to perform a scanning motion within said wide-angle field-of-view.

40. The system of claim 33, further comprising a helmet to be worn by the pilot, wherein said display is a helmet mounted display associated with said helmet.

41. The system of claim 40, further comprising a helmet tracking system for determining the attitude of the helmet relative to the aircraft, wherein said processing system is responsive to an output of said helmet tracking system to control said imaging system of said at least one air-to-air missile so as to derive said wide-angle thermal image for a region defined by an optical axis of said helmet.

* * * * *